United States Patent
Zhang

(10) Patent No.: US 11,711,280 B2
(45) Date of Patent: Jul. 25, 2023

(54) METRICS COLLECTION METHOD AND APPARATUS FOR STREAMING MEDIA, COMPUTER, AND STORAGE MEDIUM

(71) Applicant: TENCENT TECHNOLOGY (SHENZHEN) COMPANY LIMITED, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/713,566

(22) Filed: Apr. 5, 2022

(65) Prior Publication Data

US 2022/0231932 A1    Jul. 21, 2022

Related U.S. Application Data

(63) Continuation of application No. PCT/CN2021/088161, filed on Apr. 19, 2021.

(30) Foreign Application Priority Data

May 15, 2020 (CN) .......................... 202010414508.1

(51) Int. Cl.
*H04L 12/24* (2006.01)
*H04L 41/16* (2022.01)
(Continued)

(52) U.S. Cl.
CPC .............. *H04L 43/08* (2013.01); *H04L 65/60* (2013.01)

(58) Field of Classification Search
CPC ........ H04L 41/16; H04L 41/147; H04L 12/24
(Continued)

(56) References Cited

U.S. PATENT DOCUMENTS 8,942,699 B2    1/2015  Otonari
10,085,199 B1*  9/2018  Shaw .................... H04W 24/04
(Continued)

FOREIGN PATENT DOCUMENTS

CN      102006153 A    4/2011
CN      102045217 A    5/2011
(Continued)

OTHER PUBLICATIONS

The World Intellectual Property Organization (WIPO) International Search Report for PCT/CN2021/088161 dated Jul. 9, 2021 5 Pages (including translation).

*Primary Examiner* — Jude Jean Gilles
(74) *Attorney, Agent, or Firm* — Anova Law Group PLLC

(57) ABSTRACT

A metrics collection method includes: transmitting a media data obtaining request to an application service device in response to a trigger operation for streaming media; obtaining a media data response message transmitted by the application service device, the media data response message including metrics collection configuration information, and the metrics collection configuration information including metrics collection environment information and network slice information; obtaining environment information of the streaming media, and when the environment information matches the metrics collection environment information, collecting metrics data corresponding to the streaming media; determining, based on the network slice information, a network path for reporting the metrics data; and reporting the metrics data to the application service device through the network path.

20 Claims, 11 Drawing Sheets

(51) Int. Cl.
*H04L 43/08* (2022.01)
*H04L 65/60* (2022.01)
*H04W 12/062* (2021.01)
*H04W 12/63* (2021.01)

(58) Field of Classification Search
USPC .......................................................... 709/224
See application file for complete search history.

(56) References Cited

U.S. PATENT DOCUMENTS

| | | | |
|---|---|---|---|
| 2002/0129134 A1* | 9/2002 | Leighton | H04L 67/1034 |
| | | | 709/228 |
| 2002/0143888 A1* | 10/2002 | Lisiecki | H04L 67/1095 |
| | | | 709/217 |
| 2008/0071925 A1* | 3/2008 | Leighton | H04L 47/283 |
| | | | 709/241 |
| 2018/0131578 A1* | 5/2018 | Cui | H04L 41/40 |
| 2018/0139129 A1* | 5/2018 | Dowlatkhah | H04L 45/306 |
| 2018/0316608 A1* | 11/2018 | Dowlatkhah | H04L 41/509 |
| 2018/0316779 A1* | 11/2018 | Dowlatkhah | H04W 24/02 |
| 2018/0316799 A1* | 11/2018 | Shaw | H04L 41/0806 |
| 2018/0332441 A1* | 11/2018 | Shaw | H04W 36/26 |

FOREIGN PATENT DOCUMENTS

| | | |
|---|---|---|
| CN | 102075781 A | 5/2011 |
| CN | 108777866 A | 11/2018 |
| CN | 111614954 A | 9/2020 |

\* cited by examiner

METRICS COLLECTION METHOD AND APPARATUS FOR STREAMING MEDIA, COMPUTER, AND STORAGE MEDIUM

CROSS-REFERENCES TO RELATED APPLICATIONS

This application is a continuation application of PCT Patent Application No. PCT/CN2021/088161, and filed on Apr. 19, 2021, which claims priority to Chinese Patent Application No. 202010414508.1 filed on May 15, 2020, the entire contents of both of which are incorporated herein by reference.

FIELD OF THE TECHNOLOGY

The present disclosure relates to the field of computer technologies, and in particular, to a metrics collection method and apparatus for streaming media, a computer, and a readable storage medium.

BACKGROUND OF THE DISCLOSURE

Metrics collection is applied to fields such as streaming media transmission and processing. In a process of playing and displaying media display data of streaming media, metrics collection are performed on data generated during media playing and displaying, related metrics information such as data transmission delay, video viewing experience data, first buffering time or freezing time of the streaming media during the playing and displaying may be obtained, and an application (APP) corresponding to the streaming media can be optimized according to a result of the metrics collection. However, the applicant of the present disclosure finds that metrics collection in the related art is to continuously collect metrics data for user equipment (UE). In this case, a large amount of metrics data is collected, and unnecessary data may exist in the metrics data, resulting in a waste of resources.

SUMMARY

Embodiments of the present disclosure provide a metrics collection method and apparatus for streaming media, a computer, and a readable storage medium, which can improve resource utilization in performing metrics collection on streaming media.

An aspect of the embodiments of the present disclosure provides a metrics collection method for streaming media, including: obtaining metrics collection configuration information of streaming media, the metrics collection configuration information including metrics collection environment information and network slice information, the metrics collection environment information being used for indicating environment information when metrics data is acquirable for the streaming media, the network slice information being used for indicating a network path for reporting the metrics data; and performing metrics collection on the streaming media based on the metrics collection configuration information.

An aspect of the embodiments of the present disclosure provides a metrics collection method for streaming media, performed on a terminal device. The method includes: transmitting a media data obtaining request to an application service device in response to a trigger operation for streaming media; obtaining a media data response message transmitted by the application service device, the media data response message including metrics collection configuration information, and the metrics collection configuration information including metrics collection environment information and network slice information; obtaining environment information of the streaming media, and when the environment information matches the metrics collection environment information, collecting metrics data corresponding to the streaming media; determining, based on the network slice information, a network path for reporting the metrics data; and reporting the metrics data to the application service device through the network path.

An aspect of the embodiments of the present disclosure provides a computer device, including a processor and a memory, the processor being connected to the memory, the memory being configured to store program code. The processor is configured to invoke the program code, to perform: transmitting a media data obtaining request to an application service device in response to a trigger operation for streaming media; obtaining a media data response message transmitted by the application service device, the media data response message including metrics collection configuration information, and the metrics collection configuration information including metrics collection environment information and network slice information; obtaining environment information of the streaming media, and when the environment information matches the metrics collection environment information, collecting metrics data corresponding to the streaming media; determining, based on the network slice information, a network path for reporting the metrics data; and reporting the metrics data to the application service device through the network path.

An aspect of the embodiments of the present disclosure provides a non-transitory computer-readable storage medium, storing a computer program, the computer program including program instructions, the program instructions, when executed by a processor, causing the processor to perform the metrics collection method for streaming media according to one aspect of the embodiments of the present disclosure.

By implementing the embodiments of the present disclosure, the following beneficial effects are obtained:

In the embodiments of the present disclosure, metrics collection environment information and network slice information are added to metrics collection configuration information of streaming media. Environment information when metrics data is collected for the streaming media is indicated by the metrics collection environment information, so that metrics collection can be performed on the streaming media under specific environment information. Therefore, the resource utilization in metrics collection of streaming media is improved, and flexible policy control for reporting of metrics collection data is implemented.

DESCRIPTION OF EMBODIMENTS

The technical solutions in embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

The embodiments of the present disclosure relate to metrics collection technologies for streaming media. The streaming media refers to multimedia data that can use streaming technology. The streaming technology refers to a technology and process of compressing a series of media data, transmitting the data in segments on the Internet, and instantly transmitting videos and audio on the Internet for viewing. The technology enables data packets to be transmitted like a stream, and therefore is referred to as the streaming technology. The multimedia data using the streaming technology includes, but is not limited to, an audio stream, a video stream, a text stream, or the like.

Figure 1A:
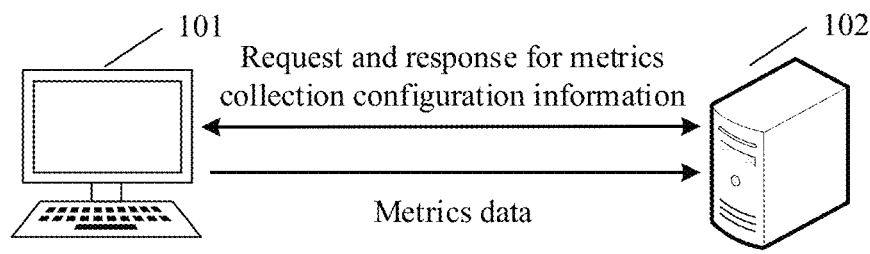
FIG. 1A is an architecture diagram of metrics collection for streaming media according to an embodiment of the present disclosure.

FIG. 1A is an architecture diagram of metrics collection for streaming media according to an embodiment of the present disclosure. As shown in FIG. 1A, this embodiment of the present disclosure is implemented by a computer device 101. The computer device 101 may be a system formed by a server and a terminal device. Alternatively, the computer device 101 may be a server or a terminal device. This is not limited herein.

For example, the computer device 101 is a terminal device. The computer device 101 obtains metrics collection configuration information from an application service device 102. The metrics collection configuration information includes metrics collection environment information, network slice information, or the like. The metrics collection environment information is used for indicating environment information when metrics data is acquirable for streaming media, and the network slice information is used for indicating a network path used for reporting the metrics data after the computer device obtains the metrics data. The computer device 101 performs metrics collection on the streaming media according to the obtained metrics collection configuration information. The metrics collection includes a metrics collection task for collecting the metrics data and metrics reporting for reporting the metrics data. In other words, the computer device 101 performs the metrics collection task according to the metrics collection configuration information, obtains the metrics data, and reports the metrics data to the application service device 102 through the network path determined by the network slice information for reporting the metrics data.

In this embodiment of the present disclosure, metrics collection environment information and network slice information are added to metrics collection configuration information, so that the computer device may perform metrics collection on the streaming media under specific environment information, and may report the obtained metrics data in a specific network path. Because a user can perform metrics collection on streaming media as required, the flexibility of performing metrics collection on streaming media is improved, and resource consumption in metrics collection of streaming media is reduced.

Figure 1B:
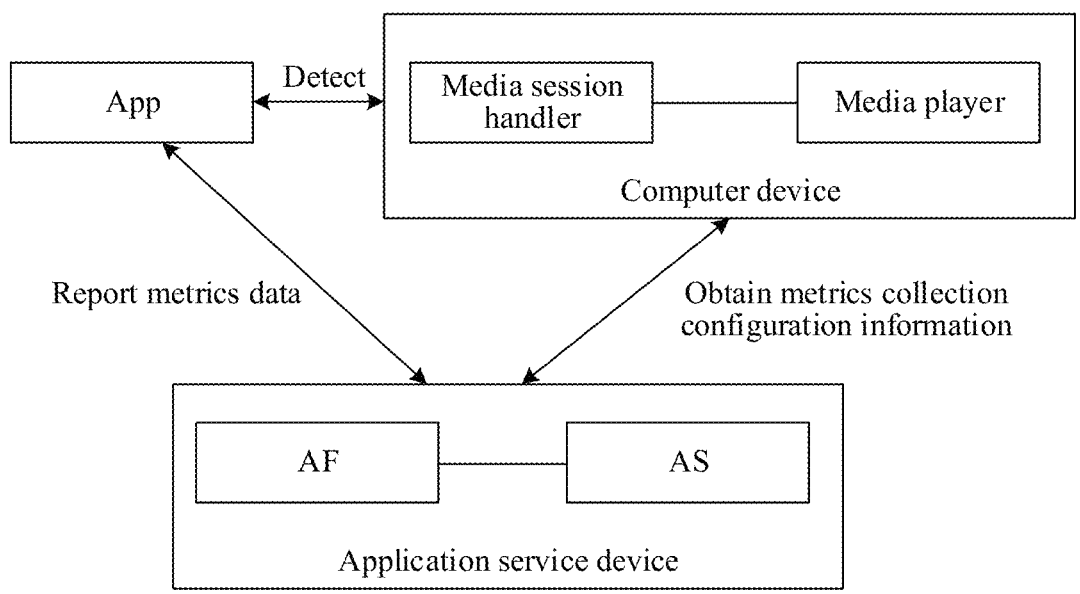
FIG. 1B is an architecture diagram of a metrics collection device for streaming media according to an embodiment of the present disclosure.

FIG. 1B is an architecture diagram of a metrics collection device for streaming media according to an embodiment of the present disclosure. As shown in FIG. 1B, this embodiment of the present disclosure is implemented by a computer device, and the computer device interacts with an application service device to implement metrics collection for streaming media.

The computer device includes a media session handler, a media player, or the like. The media session handler is configured to obtain metrics collection configuration information from the application service device, and the media player is configured to display the obtained media display data. It is to be understood that the computer device includes, but not limited to, a terminal device or a server, for example, UE. In other words, the computer device may be a server or a terminal device, or a system including a server and a terminal device. The terminal device mentioned above may be an electronic device, including, but not limited to, a mobile phone, a tablet computer, a desktop computer, a laptop computer, a palmtop computer, an augmented reality/virtual reality (AR/VR) device, a helmet-mounted display, a wearable device, a smart speaker, or another mobile Internet device (MID) with network access capabilities.

The application service device includes an application function (AF) and an application server (AS). The AF refers to a control plane function corresponding to the AF, which may be an internal AF of an operator or a third-party AF (for example, a control plane function corresponding to a video server and a game server deployed by a third party). Under a normal circumstance, an internal AF of an operator is considered to be in a trusted domain, and an AF of a third party is considered to be out of a trusted domain. The AF has rich information. For example, the AF may have a function of interacting with a network to affect service routing, triggering the establishment of a specific quality of service (QOS) flow, or the like. The AS is configured to perform data exchange on a user plane with a computer device such as UE. For example, the AS transmits metrics collection configuration information or media display data to a computer device such as UE.

The computer device monitors media display data corresponding to the media player through the media session handler, obtains metrics data, and reports the metrics data to the application service device. The application service device may be a server corresponding to an application (APP). When the APP in the computer device runs, the application service device may monitor the APP based on the obtained metrics collection configuration information, obtain metrics data, and report the metrics data to the server corresponding to the APP.

Figure 2:
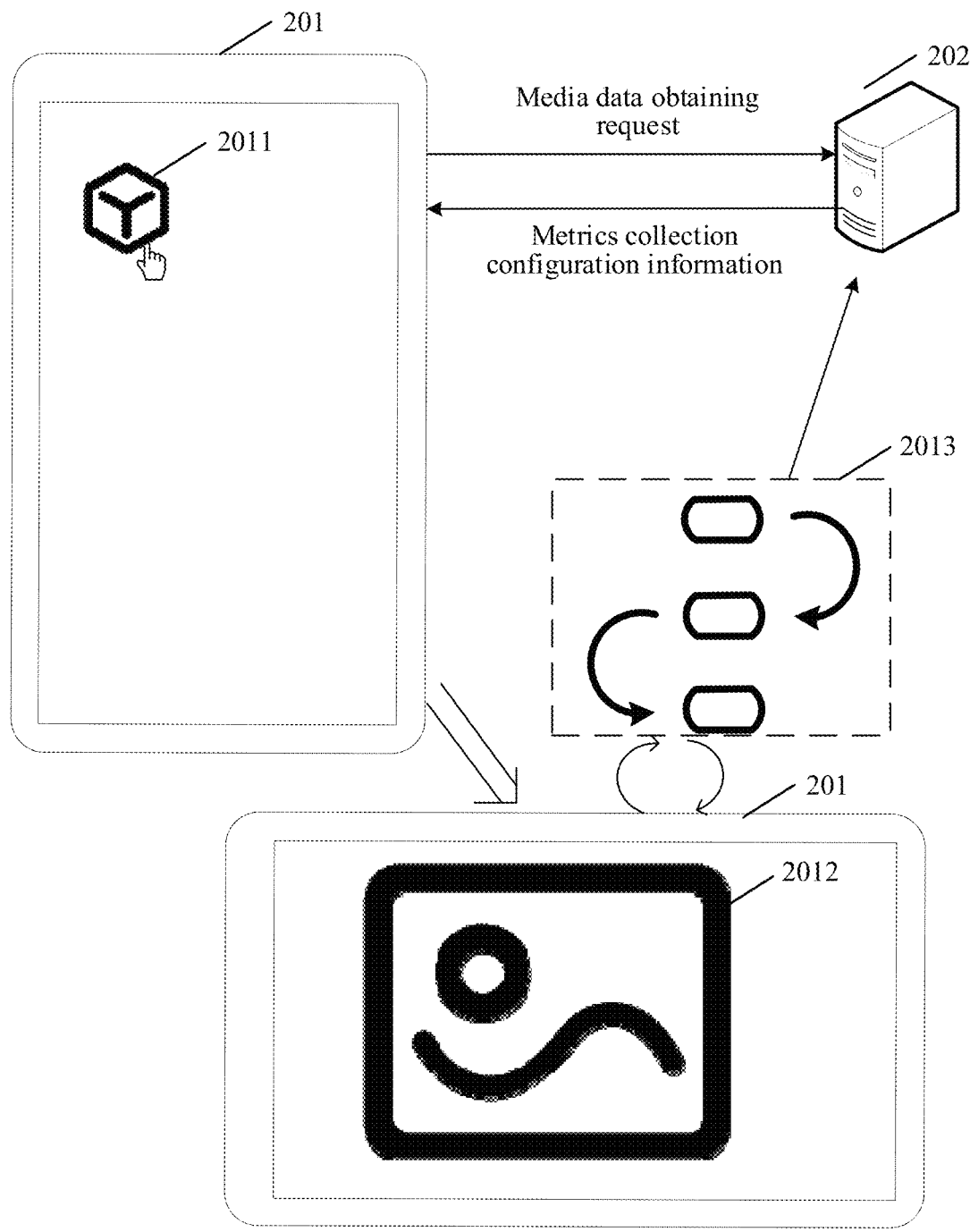
FIG. 2 is a schematic diagram of a scenario of metrics collection for streaming media according to an embodiment of the present disclosure.

FIG. 2 is a schematic diagram of a scenario of metrics collection for streaming media according to an embodiment of the present disclosure. As shown in FIG. 2, an APP 2011 in a computer device 201 is triggered and a media data obtaining request is transmitted to an application service device 202. The computer device 201 obtains metrics collection configuration information transmitted by the application service device 202, and may also obtain media display data 2012 transmitted by the application service device 202. The computer device 201 monitors a display process of the media display data 2012 through a media session handler 2013, obtains metrics data, and reports the metrics data to the application service device 202.

Figure 3:
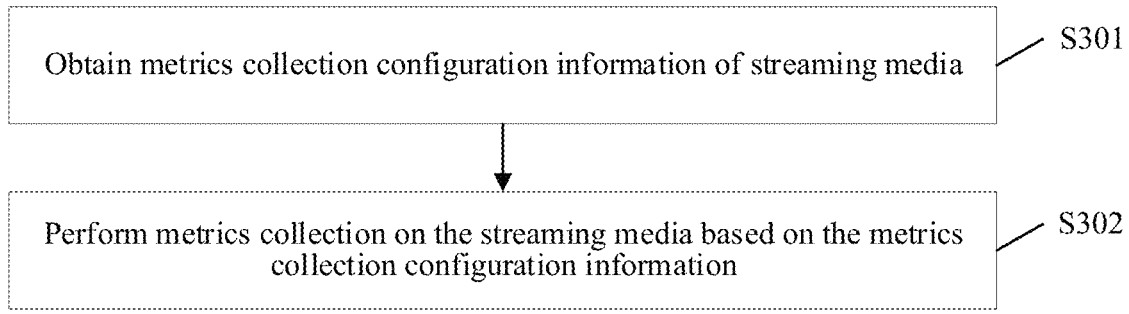
FIG. 3 is a flowchart of a metrics collection method for streaming media according to an embodiment of the present disclosure.

FIG. 3 is a flowchart of a metrics collection method for streaming media according to an embodiment of the present disclosure. As shown in FIG. 3, a metrics collection process for streaming media includes the following steps:

Step S301: Obtain metrics collection configuration information of streaming media.

For example, a computer device obtains the metrics collection configuration information of the streaming media. The metrics collection configuration information includes metrics collection environment information and network slice information. The metrics collection environment information is used for indicating environment information when metrics data is acquirable for the streaming media, and the network slice information is used for indicating a network path for reporting the metrics data. The network slice is an end-to-end logical subnet, which essentially divides a physical network into a plurality of network paths. Each network path is obtained through division according to different service requirements such as delay, bandwidth, security, and reliability, to flexibly adapt to different network application scenarios. Each network path may obtain logically independent network resources, and each slice (network path) may be independent of each other. That is, the network slice information is used for indicating a network slice for reporting metrics data, and the network slice is a specified network path.

In some embodiments, each network slice corresponds to one network slice identifier, and the network slice information may indicate the network slice for reporting metrics data by using the network slice identifier. The network slice identifier may be a character string, an access address of the network slice, a value defined by the network, or the like. This is not limited herein, and follows an existing standard or a common solution in the industry.

The metrics collection environment information includes a metrics collection time range. When a system time is within the metrics collection time range, the metrics collection environment information is used for indicating that metrics data is acquirable for the streaming media. For example, after obtaining metrics collection configuration information, the computer device performs time monitoring based on a metrics collection time range in the metrics collection configuration information, to obtain a system time, and collect metrics data for the streaming media when the system time is within the metrics collection time range.

The metrics collection environment information includes a metrics collection geographic area. When a terminal corresponding to the streaming media is located within the metrics collection geographic area, the metrics collection environment information is used for indicating that metrics data is acquirable for the streaming media. For example, the computer device monitors a geographic location of a terminal (computer device) corresponding to the streaming media, compares the geographic location with the metrics collection geographic area, and acquires metrics data for the streaming media when the geographic location is located within the metrics collection geographic area. The geographic location of the terminal corresponding to the streaming media may be data of a global positioning system (GPS) of the terminal, or location information such as a cell identity (cell ID) or a tracking area identity (TAI) of a mobile network in which the terminal is located.

The metrics collection configuration information further includes a metrics collection data type. When a data type of the streaming media belongs to the metrics collection data type and the environment information of the streaming media matches the metrics collection environment information, the metrics collection environment information is used for indicating that metrics data is acquirable for the streaming media. The data type of the streaming media may be a media format such as a video type, an audio type, a text type or an image type of the streaming media. The data type of the streaming media may be alternatively a media suffix format such as a .gif type, an .avi type, a .wma type or a .txt type of the streaming media. The data type of the streaming media may be alternatively another data type, and may be specifically set as required. This is not limited herein. For example, when obtaining a trigger operation for the streaming media, the computer device obtains the data type of the streaming media, and acquires the metrics data for the streaming media when the data type belongs to the metrics collection data type.

The metrics collection environment information may include any one of a metrics collection time range or a metrics collection geographic area, or may include both the metrics collection time range and the metrics collection geographic area. When the metrics collection environment information includes the metrics collection time range and the metrics collection geographic area, the metrics data is collected for the streaming media when a system time is within the metrics collection time range and a terminal corresponding to the streaming media is located within the metrics collection geographic area.

Step S302: Perform metrics collection on the streaming media based on the metrics collection configuration information.

For example, the computer device performs metrics collection on the streaming media based on the metrics collection configuration information. The metrics collection includes a metrics collection task and metrics reporting. The metrics collection task refers to a process in which the computer device acquires the metrics data for the streaming media, and the metrics reporting refers to a process in which the computer device reports the obtained metrics data to the application service device. For example, the computer device performs the metrics collection task on the streaming media based on metrics collection configuration information, obtains the metrics data, and reports the obtained metrics data to the application service device by using the network slice information.

In some embodiments, the metrics collection configuration information further includes a metrics collection object. When the environment information of the streaming media matches the metrics collection environment information, metrics data associated with the metrics collection object is collected for the streaming media. The metrics reporting is performed on the metrics data through the network path indicated by the network slice information. The metrics collection object is used for representing metrics that need to be collected when the computer device performs metrics collection on the streaming media. For example, when the streaming media is a video stream, the metrics collection object may be a quantity of video freezes, a first video buffering time, a video playback picture quality, or the like. When the environment information of the streaming media matches the metrics collection environment information, metrics collection is performed on the streaming media, data associated with the metrics collection object, such as the quantity of video freezes of 4, a first video buffering time of 5 seconds, a video playback picture quality of 4.5 points, video prediction information (for example, a video prediction playback time of 10 minutes), or the like is obtained and used as metrics data, and the metrics data is reported to the application service device.

In this embodiment of the present disclosure, metrics collection configuration information of streaming media is obtained, the metrics collection configuration information including metrics collection environment information and network slice information, the metrics collection environment information being used for indicating environment information when metrics data is acquirable for the streaming media, the network slice information being used for indicating a specified network path for reporting the metrics data; and metrics collection are performed on the streaming media based on the metrics collection configuration information. In this embodiment of the present disclosure, metrics collection environment information and network slice information are added to metrics collection configuration information of streaming media. Environment information when metrics data is collected for the streaming media is indicated by the metrics collection environment information, so that metrics collection can be performed on the streaming media under specific environment information, to improve the flexibility of metrics collection for streaming media. Moreover, it is beneficial to reducing the amount of data that needs to be acquired, so that metrics collection in a specified and highly concerned metrics collection environment can be implemented, thereby reducing resource consumption in the process of metrics collection for streaming media. In addition, the network path for reporting metrics data may be indicated by using the network slice information, so that metrics data can be reported in a specific network path, and the efficiency of metrics reporting is improved, which is beneficial to carrying out flexible policy and charging control on a method for reporting metrics data.

Figure 4:
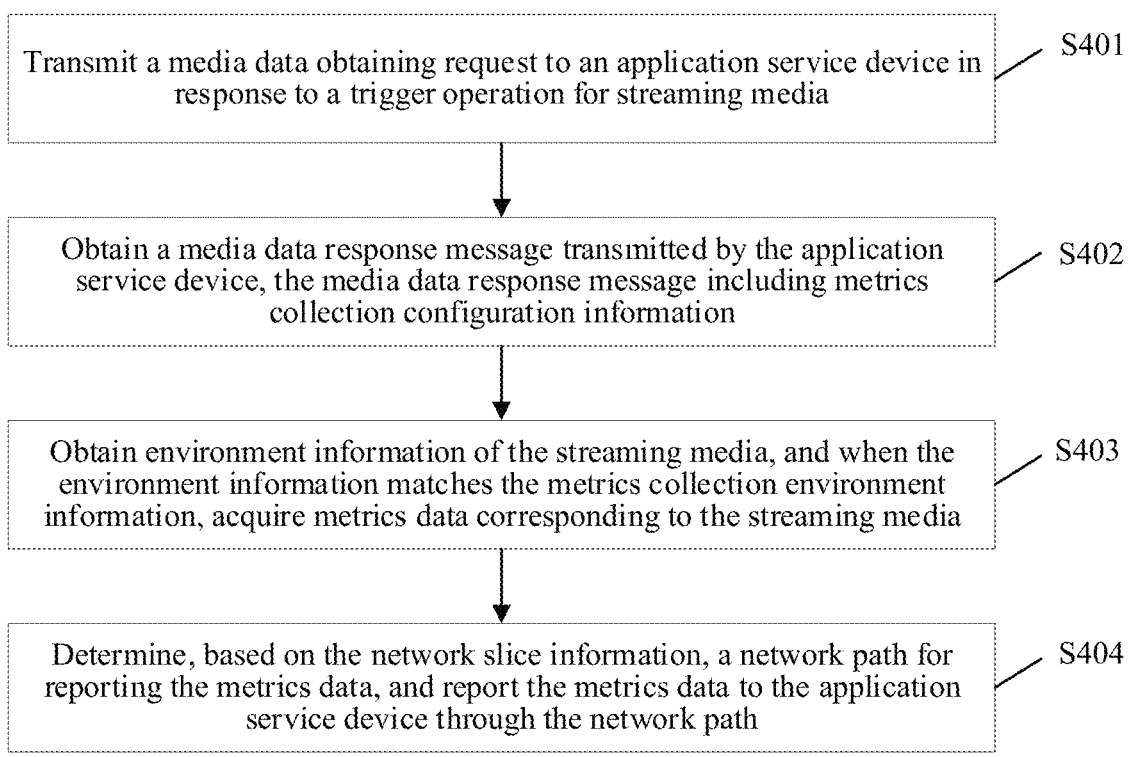
FIG. 4 is a flowchart of a metrics collection method for streaming media according to an embodiment of the present disclosure.

FIG. 4 is a flowchart of a metrics collection method for streaming media according to an embodiment of the present disclosure. As shown in FIG. 4, the method includes the following steps:

Step S401: Transmit a media data obtaining request to an application service device in response to a trigger operation for streaming media.

For example, the computer device transmits the media data obtaining request to the application service device in response to the trigger operation for the streaming media. The streaming media refers to a type of multimedia data. For example, there may be at least one APP in the computer device, and each APP may display at least one type of streaming media. When one piece of streaming media is triggered, the computer device obtains a trigger operation for the streaming media, and transmits a media data obtaining request to an application service device in response to the trigger operation. The application service device is a server corresponding to the APP in which the streaming media is located.

Figure 5:
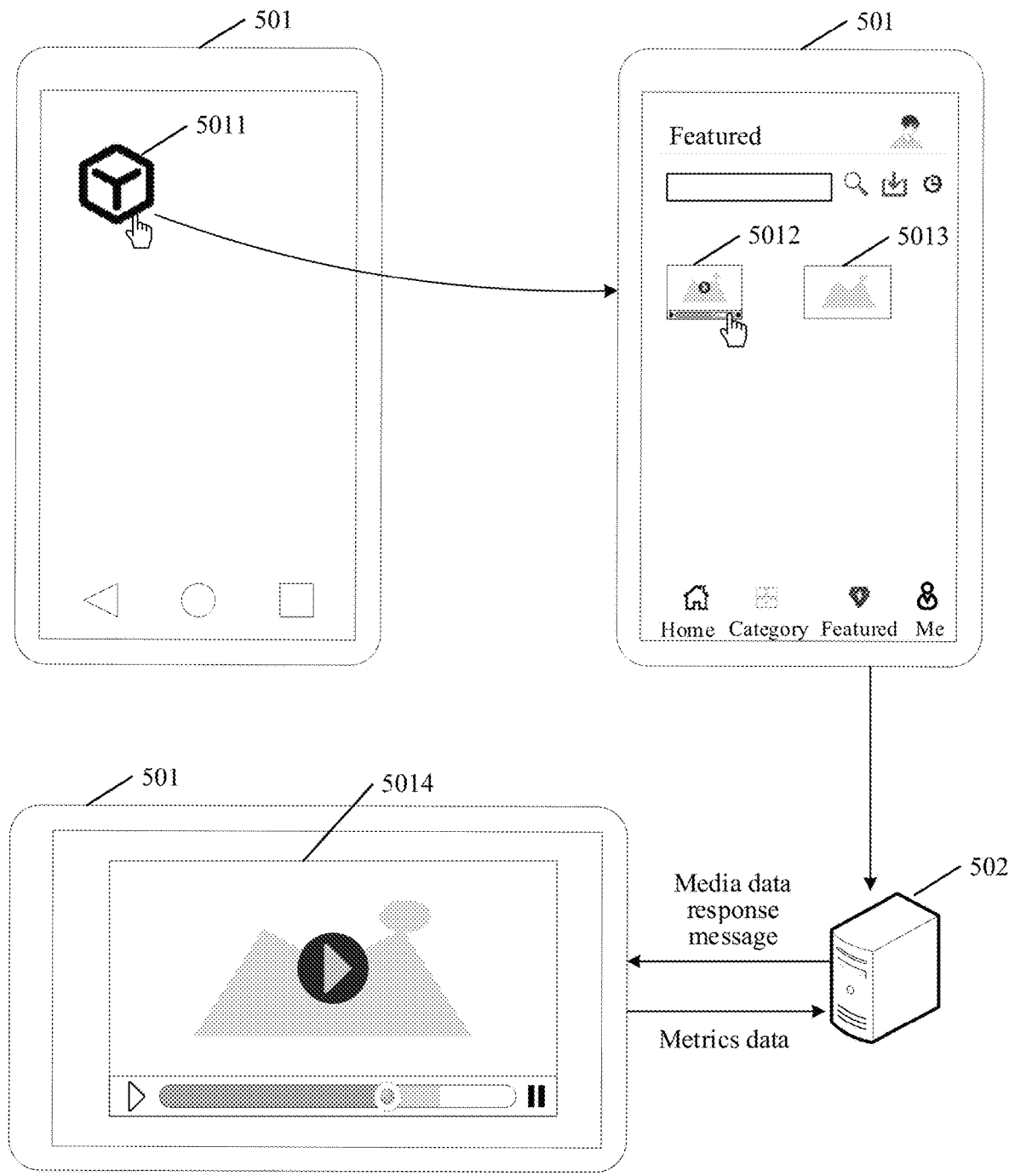
FIG. 5 is a schematic diagram of displaying streaming media data according to an embodiment of the present disclosure.

For example, FIG. 5 is a schematic diagram of displaying streaming media data according to an embodiment of the present disclosure. As shown in FIG. 5, a computer device 501 obtains a trigger operation for an APP 5011, and displays an application page of the APP 5011 in response to the trigger operation for the APP 5011. The application page includes streaming media 5012 and streaming media 5013. The streaming media 5012 is multimedia data of a video type, and the streaming media 5013 is multimedia data of an image type. The computer device 501 transmits a media data obtaining request to the application service device 502 in response to the trigger operation for the streaming media 5012. The trigger operation for the streaming media 5012 may be a click operation for the streaming media 5012, a long-press operation for the streaming media 5012, or a touch operation for the streaming media 5012. This is not limited herein.

Step S402: Obtain a media data response message transmitted by the application service device, the media data response message including metrics collection configuration information.

For example, the computer device obtains a media data response message transmitted by the application service device. The media data response message includes metrics collection configuration information, and the metrics collection configuration information includes metrics collection environment information and network slice information. The computer device obtains environment information of the streaming media, and when the environment information matches the metrics collection environment information, acquires metrics data corresponding to the streaming media. Based on the network slice information, a network path for reporting the metrics data is determined, and the metrics data is reported to the application service device through the network path.

In some embodiments, the media data response message may further include media display data, and the specific data of the streaming media includes the media display data. For example, referring to FIG. 5, the computer device 501 obtains a media data response message transmitted by the application service device 502. The media data response message may include metrics collection configuration information, and may further include media display data 5014. The computer device 501 displays the media display data 5014 based on the received media data response message.

Step S403: Obtain environment information of the streaming media, and when the environment information matches the metrics collection environment information, collect metrics data corresponding to the streaming media.

For example, the computer device obtains environment information of the streaming media, compares the environment information with the metrics collection environment information, and when the environment information matches the metrics collection environment information, acquires metrics data corresponding to the streaming media. The computer device obtains the environment information of the streaming media based on the metrics collection environment information. For example, when the metrics collection environment information includes a metrics collection time range, the computer device obtains a system time and uses the system time as the environment information of the streaming media.

Step S404: Determine, based on the network slice information, a network path for reporting the metrics data, and report the metrics data to the application service device through the network path.

For example, the computer device determines, based on the network slice information, a network path for reporting the metrics data, and reports the metrics data to the application service device through the network path. The network slice information is used for indicating a network slice for reporting metrics data, and the network slice is a specified network path. In other words, a physical network between the computer device and the application service device is divided into a plurality of network paths (or may be referred to as a plurality of network slices). The application service device determines the appropriate network slice information according to the negotiation with a network operator, and encapsulates the network slice information into the metrics collection configuration information. The process may be performed by an AS or may be performed by an AF. This is not limited herein.

In this embodiment of the present disclosure, metrics collection configuration information of streaming media is obtained, the metrics collection configuration information including metrics collection environment information and network slice information, the metrics collection environment information being used for indicating environment information when metrics data is acquirable for the streaming media, the network slice information being used for indicating a specified network path for reporting the metrics data; and metrics collection are performed on the streaming media based on the metrics collection configuration information. In this embodiment of the present disclosure, metrics collection environment information and network slice information are added to metrics collection configuration information of streaming media. Environment information when metrics data is collected for the streaming media is indicated by the metrics collection environment information, so that metrics collection can be performed on the streaming media under specific environment information, to improve the flexibility of metrics collection for streaming media. Moreover, it is beneficial to reducing the amount of data that needs to be acquired, so that metrics collection in a specified and highly concerned metrics collection environment can be implemented, thereby reducing resource consumption in the process of metrics collection for streaming media. In addition, the network path for reporting metrics data may be indicated by using the network slice information, so that metrics data can be reported in a specific network path, and the efficiency of metrics reporting is improved, which is beneficial to carrying out flexible policy and charging control on a method for reporting metrics data.

Figure 6:
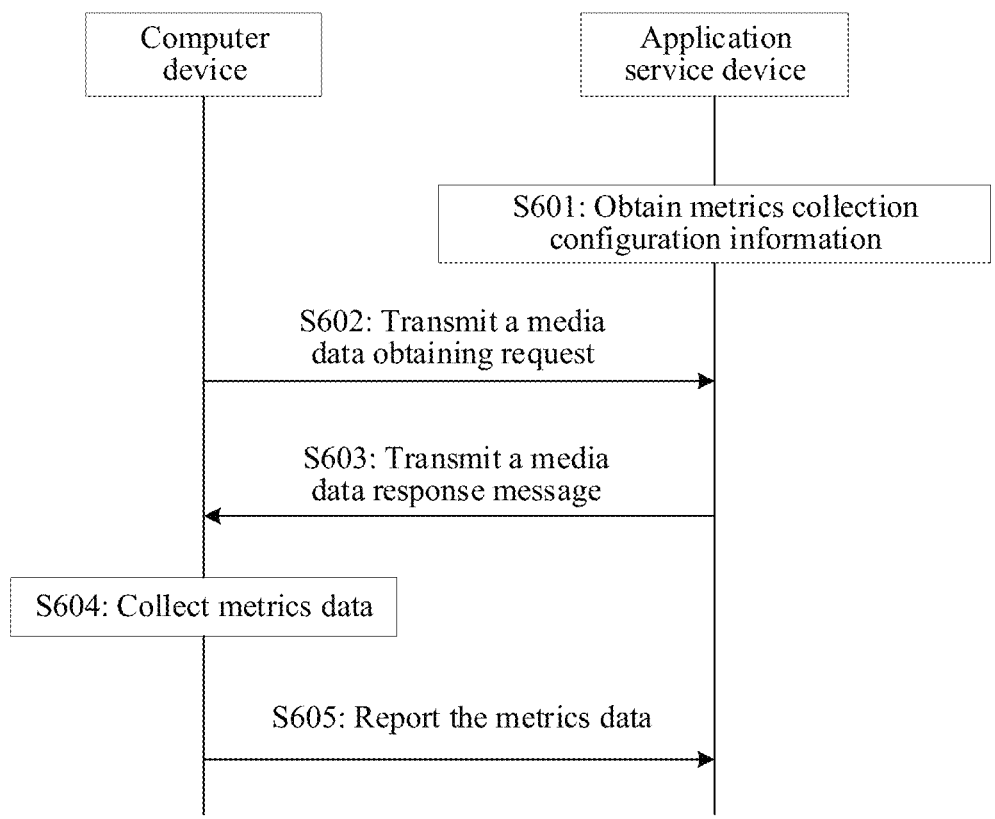
FIG. 6 is an interaction flowchart of metrics collection for streaming media according to an embodiment of the present disclosure.

FIG. 6 is an interaction flowchart of metrics collection for streaming media according to an embodiment of the present disclosure. As shown in FIG. 6, the metrics collection process includes the following steps:

Step S601: An application service device obtains metrics collection configuration information.

Figure 7:
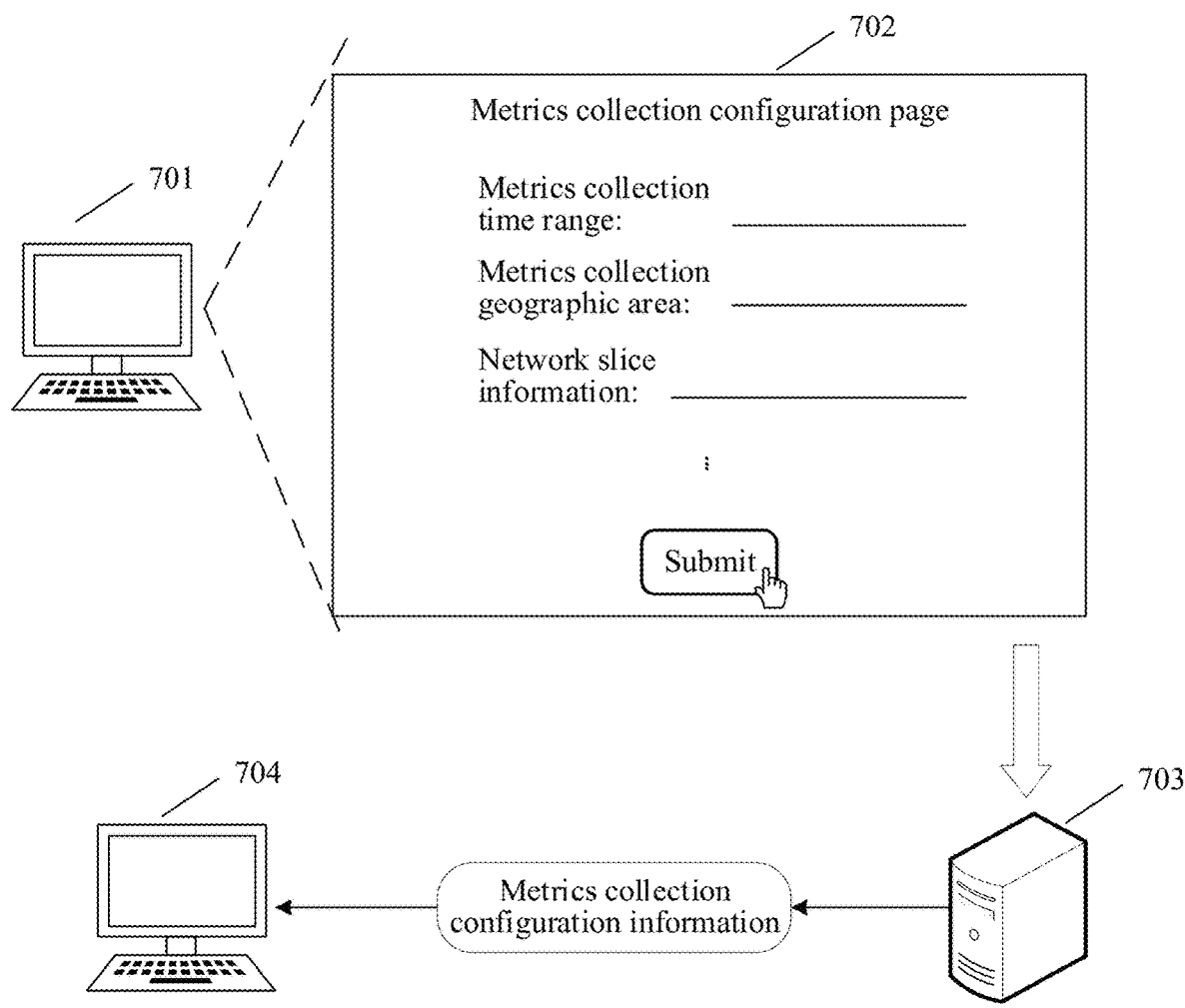
FIG. 7 is a schematic diagram of a scenario for obtaining metrics collection configuration information according to an embodiment of the present disclosure.

For example, the application service device obtains the metrics collection configuration information, and stores the metrics collection configuration information. FIG. 7 is a schematic diagram of a scenario for obtaining metrics collection configuration information according to an embodiment of the present disclosure. As shown in FIG. 7, metrics collection configuration parameters are configured through a metrics collection configuration page 702 of a terminal device 701. For example, a metrics collection time range, a metrics collection geographic area, and a network slice information are set. After the metrics collection configuration parameters are set, an application service device 703 obtains various metrics collection configuration parameters including the metrics collection time range, the metrics collection geographic area, and the network slice information. The various metrics collection configuration parameters are not required items. That is, the application service device 703 may obtain a metrics collection configuration parameter whose value is not empty, to obtain the metrics collection configuration information. Then, the application service device 703 transmits the metrics collection configuration information to a computer device 704. For details, refer to the descriptions shown in steps S602 and S603 below. The terminal device 701 may be a third-party device, or may be a terminal device with a display function corresponding to the application service device 703. This is not limited herein.

Step S602: A computer device transmits a media data obtaining request to the application service device.

For example, the computer device transmits the media data obtaining request to the application service device in response to a trigger operation for streaming media. For example, the computer device obtains a media identifier of the streaming media in response to the trigger operation for the streaming media, and transmits a media data obtaining request to the application service device based on the media identifier. After receiving the media data obtaining request, the application service device obtains media display data corresponding to the media identifier, obtains metrics collection configuration information, and generates the media data response message according to the metrics collection configuration information and the media display data. The application service device may store only one piece of metrics collection configuration information. After receiving the media data obtaining request, the application service device generates the media data response message according to the metrics collection configuration information and the media display data.

In some embodiments, the application service device may store a plurality of (at least two) pieces of metrics collection configuration information, and the media data obtaining request further includes a media content category. For example, the computer device obtains the media identifier and the media content category of the streaming media in response to the trigger operation for the streaming media; and encapsulates the media identifier and the media content category into the media data obtaining request, and transmits the media data obtaining request to the application service device. The application service device obtains the media data obtaining request transmitted by the computer device, obtains metrics collection configuration information corresponding to the media content category based on the media data obtaining request, obtains media display data corresponding to the media identifier, and generates a media data response message according to the metrics collection configuration information and the media display data. The media content category may be a data type such as a video type, a sound type, a text type or an image type of the streaming media, and reference may be made to the description of a data type in step S301 in FIG. 3. Details are not described herein again. The media content category may be alternatively a category such as a game category, a restaurant category or a film and television category of the content of the streaming media. The application service device may store a plurality of pieces of metrics collection configuration information, and each piece of metrics collection configuration information corresponds to one media content category. The metrics collection configuration information is used for indicating that metrics collection is performed only for the streaming media of a media content category corresponding to the metrics collection configuration information.

In some embodiments, when the media data obtaining request does not include a media content category, the application service device obtains the metrics collection configuration information according to the media data obtaining request transmitted by the computer device. For example, the application service device may obtain the media display data based on the media identifier in the media data obtaining request, parse the media display data, determine the media content category of the streaming media, and obtain the metrics collection configuration information according to the media content category. In some embodiments, the metrics collection configuration information may further include a media content category, and the media content category is used for indicating that the metrics collection configuration information is only valid for a specific media content category.

For example, the computer device obtains the media content category of the streaming media as a game category in response to the trigger operation for the streaming media, obtains the media identifier of the streaming media, encapsulates the media identifier and the media content category of the "game category" into a media data obtaining request, and transmits the media data obtaining request to the application service device. The application service device obtains the metrics collection configuration information corresponding to the media content category of the "game category", obtains the media display data corresponding to the media identifier, and generates a metrics collection response message according to the metrics collection configuration information and the media display data.

In some embodiments, one piece of streaming media may correspond to a plurality of media content categories. For example, the media content category is the data type of the streaming media. When the streaming media is a video, the streaming media may correspond to a media content category such as a video type, a sound type or a text type (for example, subtitles). For example, after receiving the media data obtaining request, the application service device determines a plurality of media content categories corresponding to the streaming media based on the media data obtaining request, obtains metrics collection configuration information corresponding to the media content categories, and generates a media data response message according to the metrics collection configuration information corresponding to the media content categories of the streaming media and the obtained media display data.

Step S603: The application service device transmits a media data response message to the computer device.

For example, the application service device transmits the media data response message to the computer device, and the computer device obtains the media data response message. The media data response message includes metrics collection configuration information, and the metrics collection configuration information includes metrics collection environment information and network slice information. In some embodiments, the media data response message may further include media display data.

Step S604: The computer device acquires metrics data.

For example, the computer device obtains environment information of the streaming media, and when the environment information matches the metrics collection environment information, acquires metrics data corresponding to the streaming media.

The metrics collection configuration information includes a metrics collection time range. The computer device obtains a system time, and determines the system time as the environment information of the streaming media. When the system time is within the metrics collection time range, it is determined that the environment information matches the metrics collection environment information, and the metrics data corresponding to the streaming media is acquired according to a matching result. For example, the metrics collection time range is 8:00 to 12:00. After the display of the media display data corresponding to the streaming media starts, between 8:00 and 12:00, the computer device acquires the metrics data corresponding to the streaming media according to other parameters in the metrics collection configuration information. When a display start time of the streaming media is 9:00 and a display end time of the streaming media is 13:00, the computer device acquires the metrics data of the streaming media from 9:00 to 12:00 according to the metrics collection configuration information. When the display start time of the streaming media is 9:00 and a display end time of the streaming media is 11:00, the computer device acquires the metrics data of the streaming media from 9:00 to 11:00 according to the metrics collection configuration information. In other words, within the metrics collection time range, the computer device may obtain metrics data within a time period during which the streaming media is displayed.

The metrics collection configuration information includes a metrics collection geographic area. When the metrics collection configuration information includes a metrics collection geographic area, the computer device obtains a geographic location of a terminal corresponding to the streaming media when the media display data of the streaming media starts to be displayed. When the geographic location is located within the metrics collection geographic area, it is determined that the environment information matches the metrics collection environment information, and the metrics data corresponding to the streaming media is acquired according to a matching result. Specifically, the metrics data corresponding to the streaming media may be acquired according to the matching result and other parameters in the metrics collection configuration information. For example, information of a cell ID of the metrics collection geographic area is 0001. When a cell ID of a geographic location of the terminal corresponding to the streaming media is 0001, it is determined that the environment information matches the metrics collection environment information, and the metrics data corresponding to the streaming media is acquired according to the matching result and other parameters in the metrics collection configuration information.

The metrics collection configuration information further includes a metrics collection data type. The computer device obtains a data type of the streaming media. When the data type of the streaming media belongs to the metrics collection data type, the metrics data corresponding to the streaming media is acquired. The metrics collection environment information may include any one of a metrics collection time range or a metrics collection geographic area, or may include both the metrics collection time range and the metrics collection geographic area. For example, when the metrics collection data type is a video type, the data type of the streaming media is obtained. When the data type of the streaming media is a video type and the environment information of the streaming media matches the metrics collection environment information, the metrics data corresponding to the streaming media is acquired.

In some embodiments, when the metrics collection configuration information includes a metrics collection data type, the computer device acquires the metrics data corresponding to the streaming media when the data type of the streaming media belongs to the metrics collection data type. When the metrics collection configuration information includes a metrics collection data type and metrics collection environment information, the computer device acquires the metrics data corresponding to the streaming media when the data type of the streaming media belongs to the metrics collection data type and the environment information of the streaming media matches the metrics collection environment information.

The metrics collection configuration information may further include a metrics collection object, and the media data response message may further include media display data. The computer device creates a metrics collection task, and obtains metrics data associated with the metrics collection object in the metrics collection configuration information. The metrics collection task is performed on the media display data, and metrics data associated with the metrics collection object is obtained. For example, the computer device acquires the metrics data through a media session handler and a media player, displays the media display data through the media player, and monitors a display process of the media display data based on the metrics collection task; obtains data that is generated in the display process and is associated with the metrics collection object, and determines the data associated with the metrics collection object as the metrics data; and obtains, through the media session handler, the metrics data determined based on the media player. The media session handler may be integrated in the media player, or may be an independent logic function.

In some embodiments, the metrics collection configuration information may further include parameters such as an AF address list, data network name (DNN) information, a reporting interval or a sampling ratio. The computer device may perform metrics collection on the streaming media according to the parameters included in the metrics collection configuration information.

The AF address list refers to a list of AF addresses for receiving metrics data reported by the computer device, including AF addresses in the application service device. When the metrics collection configuration information includes an AF address list, the computer device may select an AF address from the AF address list as an AF address for receiving metrics data. The computer device may randomly select an AF address from the AF address list as the AF address for receiving metrics data; or select an AF address from the AF address list according to a specific round-robin algorithm as the AF address for receiving metrics data. This is not limited herein.

The round-robin algorithm is a load balancing algorithm, which allocates the metrics data that needs to be reported to the AF addresses in the AF address list in turn, for example, starting from the first AF address to the last AF address in the AF address list, and then repeats the cycle. The round-robin algorithm in this embodiment of the present disclosure is not limited to a round-robin scheduling algorithm, a weighted round-robin scheduling algorithm, or the like. The weighted round-robin scheduling algorithm assigns different weights to the AF addresses according to different processing capabilities of the AF addresses, so that the AF addresses can accept metrics data of corresponding weights.

The DNN information is used for specifying a DNN for reporting metrics data. When the parameter is not defined in the metrics collection configuration information, the metrics data may be transmitted on a default DNN. When the metrics collection configuration information includes DNN information, a DNN specified in the DNN information is used as the DNN for reporting metrics data.

In some embodiments, when the metrics collection configuration information includes DNN information and network slice information, the computer device may determine, according to the DNN information and the network slice information, a network path for reporting metrics data. In other words, the computer device may determine, by using both the DNN information and the network slice information, a network path for reporting metrics data.

The reporting interval refers to a time interval for reporting metrics data. When the parameter is not defined in the metrics collection configuration information, the computer device may report the metrics data once at the end of a streaming media session. When the metrics collection configuration information includes the reporting interval, the computer device reports the metrics data according to a time interval indicated by the reporting interval. For example, the reporting interval is 3 hours. The computer device reports the metrics data once at 8:00, and then reports the metrics data again at 11:00. The metrics data reported by the computer device at 11:00 is the metrics data generated by the streaming media between 8:00 and 11:00.

The sampling ratio refers to a ratio of UEs that need to collect metrics data. When the parameter is not defined in the metrics collection configuration information, all computer devices (UEs) need to report metrics data. When the metrics collection configuration information includes a sampling ratio, only some computer devices need to report metrics data. For example, when a sampling ratio is 50%, among computer devices (UEs) accessing the application service device, only 50% of the computer devices need to report metrics data.

In some embodiments, when the metrics collection configuration information includes a sampling ratio, the application service device may select, from the associated computer devices according to the sampling ratio, a computer device that needs to report the metrics data, and transmit a metrics reporting request to the computer device that needs to report the metrics data. The computer device that needs to report the metrics data may change. For example, when the sampling ratio changes, or after a particular metrics collection time interval, the application service device may re-determine, according to the sampling ratio, a computer device that needs to report metrics data. This is not limited herein.

The metrics collection configuration information may include any one of the parameters mentioned in this embodiment of the present disclosure, or may include any N parameters of the parameters. N is a positive integer, and N is less than or equal to a quantity of all the parameters mentioned above.

In some embodiments, when the metrics collection configuration information includes a plurality of parameters, the computer device may perform metrics collection on the streaming media according to the plurality of parameters included in the metrics collection configuration information. For example, the metrics collection configuration information includes a metrics collection time range and a reporting interval, the computer device may perform a metrics collection task within the metrics collection time range, and report the metrics data to the application service device once every time period corresponding to the reporting interval. For example, it is assumed that a metrics collection time range is 8:00 to 13:00 and a reporting interval is 2 hours. The computer device acquires and reports metrics data once at 8:00, reports metrics data once at 10:00 (the metrics data acquired during the period from 8:00 to 10:00), and reports metrics data once at 12:00 (the metrics data acquired during the period from 10:00 to 12:00).

Figure 8:
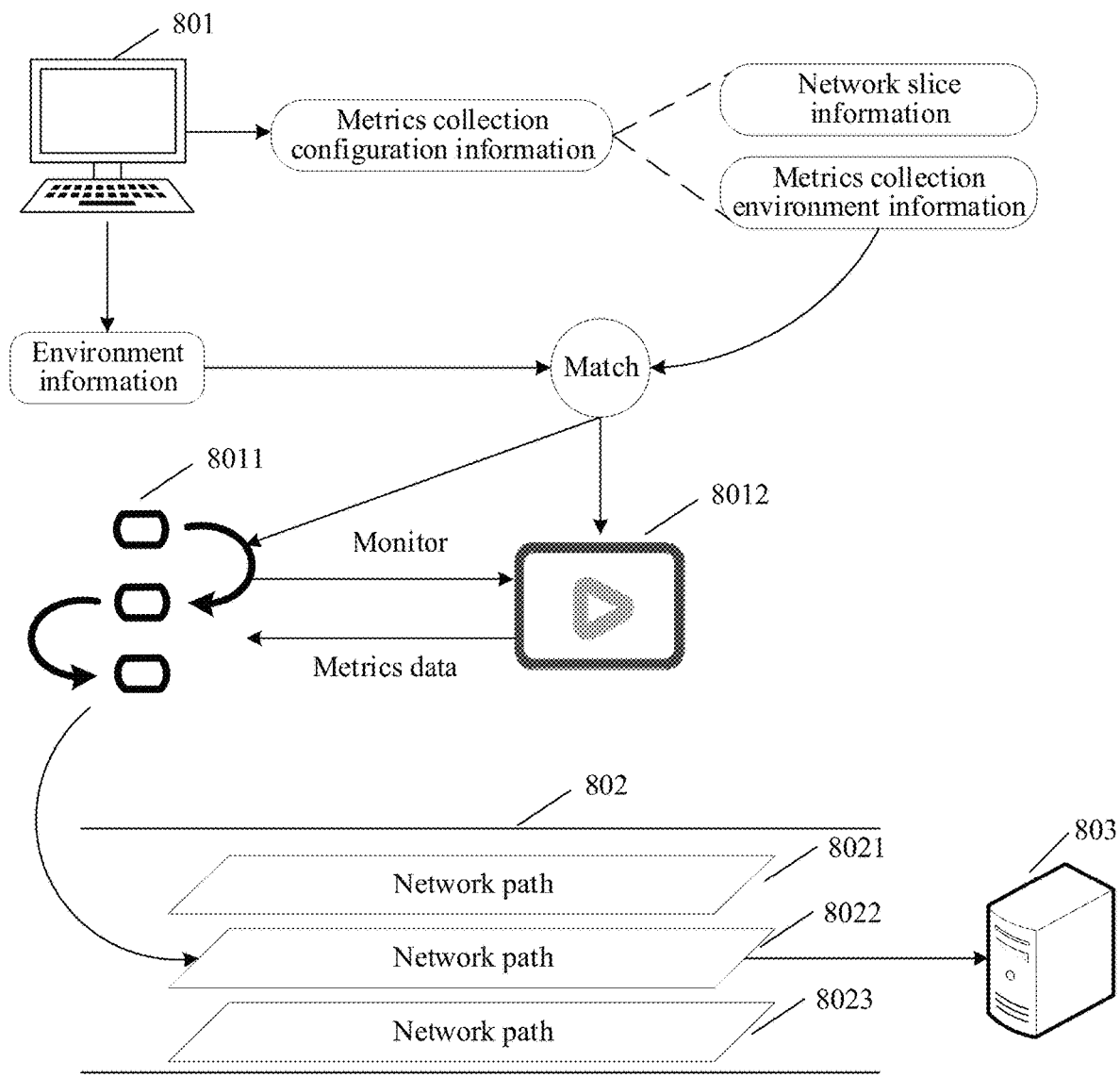
FIG. 8 is a schematic diagram of a scenario of metrics collection according to an embodiment of the present disclosure.

FIG. 8 is a schematic diagram of a scenario of metrics collection according to an embodiment of the present disclosure. As shown in FIG. 8, a computer device 801 obtains metrics collection configuration information, and the metrics collection configuration information includes metrics collection environment information and network slice information. The computer device 801 obtains environment information of the streaming media, when the environment information of the streaming media matches the metrics collection environment information, displays media display data through a media player 8012, creates a metrics collection task through a media session handler 8011, monitors a display process of the media display data based on the metrics collection task, and obtains data generated in the display process, to obtain metrics data.

Step S605: The computer device reports the metrics data to the application service device.

For example, based on the network slice information, a network path for reporting the metrics data is determined, and the metrics data is reported to the application service device through the network path. For example, the computer device reports the metrics data to the application service device through the media session handler and the specified network path.

Referring to FIG. 8, after obtaining the metrics data, the media session handler 8011 in the computer device determines the network path by using the network slice information. For example, a physical network 802 between the computer device 801 and an application service device 803 is divided into a network path 8021, a network path 8022, and a network path 8023 that correspond to different network slices respectively. The computer device determines, by using the network slice information, that the network path for reporting metrics data is the network path 8022, and the media session handler in the computer device reports the metrics data to the application service device 803 in the network path 8022.

A plurality of network paths obtained by dividing the physical network between the computer device and the application service device may be used for satisfying different service requirements. When the media data obtaining request includes a media content category, the network slice information in the metrics collection configuration information may include the network path for reporting the metrics data. The network slice information configured in the metrics collection configuration information corresponding to different media content categories may not be identical, so that the metrics data of the streaming media of the corresponding media content category may be reported through different network paths. Therefore, the utilization of network bandwidth is improved, and the efficiency of metrics reporting is improved, so that more refined policy and charging control is carried out.

Alternatively, the network slice information may be a mapping relationship between the data type of the streaming media and the network path. After obtaining the metrics data, the computer device obtains a data type of the streaming media, obtains a network path corresponding to the data type from the network slice information, and reports the metrics data in the network path. A default network path may exist between the computer device and the application service device. The default network path refers to the network path for reporting metrics data when the network slice information is empty. For example, when the metrics collection configuration information obtained by the computer device does not include network slice information, the default network path is obtained, and the metrics data is reported through the default network path.

In some embodiments, the network slice information may further include at least two candidate network paths, and may further include priorities of the candidate network paths. After obtaining the metrics data, the computer device may select a candidate network path from the candidate network paths as the network path for reporting the metrics data, to transmit the metrics data; or may determine the candidate network path with the largest priority among the at least two candidate network paths as the network path for reporting metrics data; or may select one of the network paths according to a specific round-robin algorithm for reporting metrics data; or may determine, from the at least two candidate network paths based on a path selection algorithm and the priorities of the candidate network paths, the network path for reporting the metrics data.

When the network slice information includes only one candidate network path, the candidate network path is used as the network path for reporting metrics data. When the network slice information includes at least two candidate network paths and priorities of the candidate network paths, the network path for reporting metrics data is determined from the at least two candidate network paths according to the priorities and the first path selection algorithm or configuration. When the network slice information includes at least two candidate network paths and does not include priorities of the candidate network paths, the network path for reporting metrics data is selected from the at least two candidate network paths based on a second path selection algorithm or configuration (for example, a round-robin algorithm).

For example, the application service device may obtain abnormal data of an APP according to the obtained metrics data. For example, the metrics data includes a quantity of video freezes, and the application service device counts the metrics data of the streaming media in UEs. When a quantity of UEs whose video display freezes is greater than a freeze threshold of the APP, it is determined that the display process of the streaming media in the APP is abnormal. A streaming media exception message may be transmitted to an administrator, so that the administrator can monitor a network environment or the like of the streaming media based on the streaming media exception message. When a quantity of video freezes or a duration of a video freeze in the metrics data is greater than an abnormal freezing threshold, it may be considered that video display of the UE corresponding to the metrics data freezes. When the metrics data of the streaming media in single UE is abnormal, the application service device may adjust the related algorithms and settings of the streaming media of the UE, and adopt some compromised technical solutions, for example, reducing the image quality of the streaming media to reduce video freezes.

In this embodiment of the present disclosure, metrics collection environment information and network slice information are added to metrics collection configuration information of streaming media. Environment information when metrics data is collected for the streaming media is indicated by the metrics collection environment information, so that metrics collection can be performed on the streaming media under specific environment information, to improve the flexibility of metrics collection for streaming media. Moreover, it is beneficial to reducing the data amount of metrics data that needs to be acquired, so that metrics collection in a specified and highly concerned metrics collection environment can be implemented, thereby reducing resource consumption in the process of metrics collection for streaming media. In addition, the network path for reporting metrics data may be indicated by using the network slice information, so that metrics data can be reported in a specific network path, and the efficiency of metrics reporting is improved, which is beneficial to carrying out flexible policy and charging control on a method for reporting metrics data. For example, the metrics collection configuration information may further include a metrics collection data type, to implement the function that the application service device needs to collect metrics data of streaming media of a specific data type, so that the flexibility of metrics collection is further improved.

Figure 9:
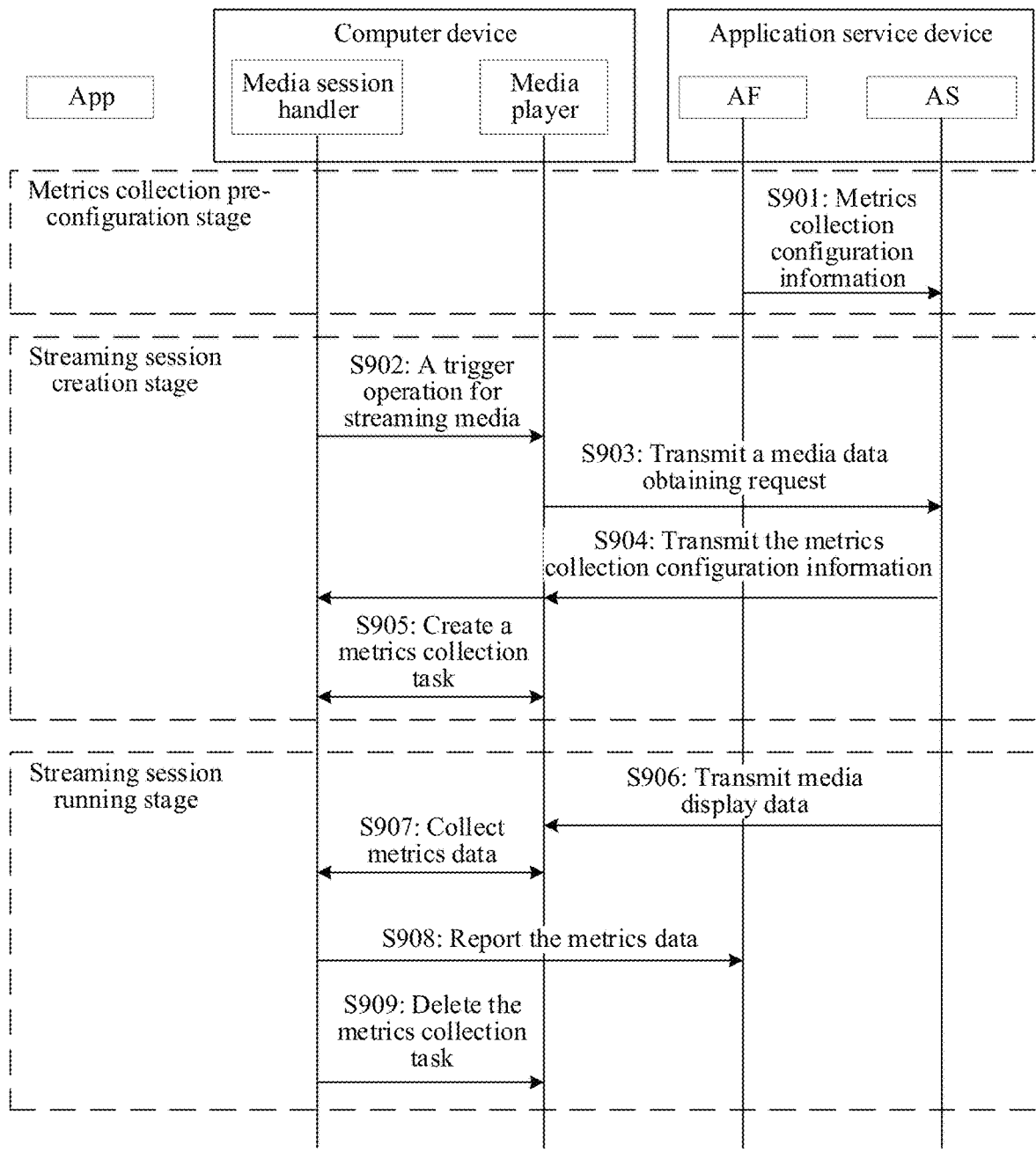
FIG. 9 is a schematic diagram of an interaction process between metrics collection modules according to an embodiment of the present disclosure.

FIG. 9 is a schematic diagram of an interaction process between metrics collection modules according to an embodiment of the present disclosure. A metrics collection process of the streaming media includes a metrics collection pre-configuration stage, a streaming session creation stage, and a streaming session running stage. The streaming session refers to a session generated when the streaming media is triggered, and represents a process of data exchange between the computer device and the application service device. The computer device includes a media session handler and a media player, and the application service device includes an AF and an AS. The APP refers to a program running in the computer device, and the application service device stores the data of the APP.

The metrics collection pre-configuration stage includes step S901:

Step S901: An AF transmits metrics collection configuration information to an application service device.

For example, the AF belongs to a control plane, the AF obtains the metrics collection configuration information, and transmits the metrics collection configuration information to an AS, the AS stores the metrics collection configuration information, and reference may be made to the description shown in step S601 in FIG. 6.

The streaming session creation stage includes steps S902 to S905:

Step S902: Obtain a trigger operation for streaming media.

For example, the computer device obtains the trigger operation for the streaming media in an APP. The streaming media refers to multimedia data that can be displayed in the APP.

Step S903: Transmit a media data obtaining request.

For example, a media player in the computer device transmits the media data obtaining request to an AS in response to the trigger operation for the streaming media. For example, reference may be made to the description shown in step S602 in FIG. 6. Details are not described herein again.

Step S904: Transmit the metrics collection configuration information in a media data response message.

For example, the AS obtains the metrics collection configuration information based on the media data obtaining request, and transmits the metrics collection configuration information to the computer device. Both the media session handler and the media player in the computer device can obtain the metrics collection configuration information. For the process, reference may be made to the determining process of the metrics collection configuration information shown in step S603 in FIG. 6.

Step S905: Create a metrics collection task.

For example, the computer device creates the metrics collection task. For example, the media session handler transmits a request for creating the metrics collection task to the media player, the media player determines to create the metrics collection task, and transmits an acknowledgement message for creating the metrics collection task to the media session handler, and the media session handler transmits the metrics collection configuration information to the media player, to create the metrics collection task.

The streaming session running stage includes the following steps S906 to S909:

Step S906: Transmit media display data.

For example, the AS transmits the media display data to the media player, the media display data being transmitted based on the media data obtaining request transmitted by the computer device to the AS, and transmits the media display data to the computer device in a media data response message.

Step S907: Collect metrics data.

For example, the computer device acquires metrics data based on the metrics collection configuration information. For example, the media session handler transmits a metrics collection request to the media player, and the media player acquires metrics data based on the metrics collection request, and transmits the acquired metrics data to the media session handler. For the process, reference may be made to the description shown in step S604 in FIG. 6.

Step S908: Report the metrics data.

For example, the media session handler reports the metrics data to an AF through the network path indicated by the network slice information.

Step S909: Delete the metrics collection task.

For example, because the streaming media is a type of multimedia data based on streaming transmission, the AS transmits a media display data segment a plurality of times, to implement the process of transmitting the media display data to the media player. Therefore, before the transmission of the media display data is completed, steps S906 to S908 are repeated in this embodiment of the present disclosure. When the transmission of the media display data is completed, the computer device deletes the metrics collection task.

The metrics collection pre-configuration stage and the streaming session creation stage are not necessarily continuous. That is, when the metrics collection pre-configuration stage is completed, after a period of time, when obtaining the trigger operation for the streaming media, the computer device starts the streaming session creation stage, or the computer device may directly obtain the trigger operation for the streaming media and start the streaming session creation stage. The AF may also be replaced by a media operations administration and maintenance (Media OAM) system, and the specific implementation process is the same as that of the AF.

Figure 10:
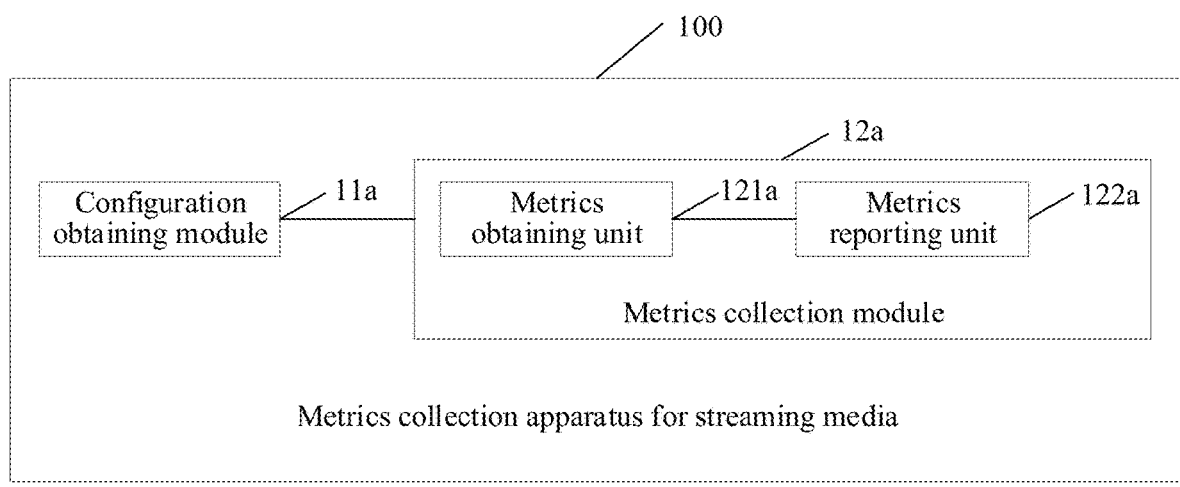
FIG. 10 is a schematic diagram of a metrics collection apparatus for streaming media according to an embodiment of the present disclosure.

FIG. 10 is a schematic diagram of a metrics collection apparatus for streaming media according to an embodiment of the present disclosure. The metrics collection apparatus for streaming media may be a computer program (including program code) running in the computer device. For example, the metrics collection apparatus for streaming media is application software. The apparatus may be configured to perform the corresponding steps in the method provided in the embodiments of the present disclosure. As shown in FIG. 10, a metrics collection apparatus 100 for streaming media may be applied to the computer device in the embodiment corresponding to FIG. 3 above. Specifically, the apparatus may include: a configuration obtaining module 11A and a metrics collection module 12a.

The configuration obtaining module 11A is configured to obtain metrics collection configuration information of streaming media, the metrics collection configuration information including metrics collection environment information and network slice information, the metrics collection environment information being used for indicating environment information when metrics data is acquirable for the streaming media, the network slice information being used for indicating a network path for reporting the metrics data. The metrics collection module 12a is configured to perform metrics collection on the streaming media based on the metrics collection configuration information.

In some embodiments, the metrics collection environment information includes a metrics collection time range; and when a system time is within the metrics collection time range, the metrics collection environment information is used for indicating that metrics data is acquirable for the streaming media.

In some embodiments, the metrics collection environment information includes a metrics collection geographic area; and when a terminal corresponding to the streaming media is located within the metrics collection geographic area, the metrics collection environment information is used for indicating that metrics data is acquirable for the streaming media.

In some embodiments, the metrics collection configuration information further includes a metrics collection data type; and when a data type of the streaming media belongs to the metrics collection data type, the metrics collection data type is used for indicating that metrics data is acquirable for the streaming media.

In some embodiments, the metrics collection configuration information further includes a metrics collection object. The metrics collection module 12a includes: a metrics obtaining unit 121A, configured to: when the environment information of the streaming media matches the metrics collection environment information, collect metrics data associated with the metrics collection object for the streaming media; and a metrics reporting unit 122a, configured to perform metrics reporting on the metrics data through the network path indicated by the network slice information.

This embodiment of the present disclosure provides a metrics collection apparatus for streaming media. The apparatus obtains metrics collection configuration information of streaming media, the metrics collection configuration information at least including metrics collection environment information and network slice information, the metrics collection environment information being used for indicating environment information when metrics data is acquirable for the streaming media, the network slice information being used for indicating a specified network path for reporting the metrics data; and metrics collection are performed on the streaming media based on the metrics collection configuration information. In this embodiment of the present disclosure, metrics collection environment information and network slice information are added to metrics collection configuration information of streaming media. Environment information when metrics data is collected for the streaming media is indicated by the metrics collection environment information, so that metrics collection can be performed on the streaming media under specific environment information, to improve the flexibility of metrics collection for streaming media, and metrics data is collected only under specific environment information. Moreover, metrics data is collected only under specific environment information, and the data amount of the acquired metrics data is greatly reduced, so that metrics collection in a specified and highly concerned metrics collection environment can be implemented, thereby reducing resource consumption in the process of metrics collection for streaming media. In addition, the network path for reporting metrics data may be indicated by using the network slice information, so that metrics data can be reported in a specific network path, and the efficiency of metrics reporting is improved, which is beneficial to carrying out flexible policy and charging control on a method for reporting metrics data.

Figure 11:
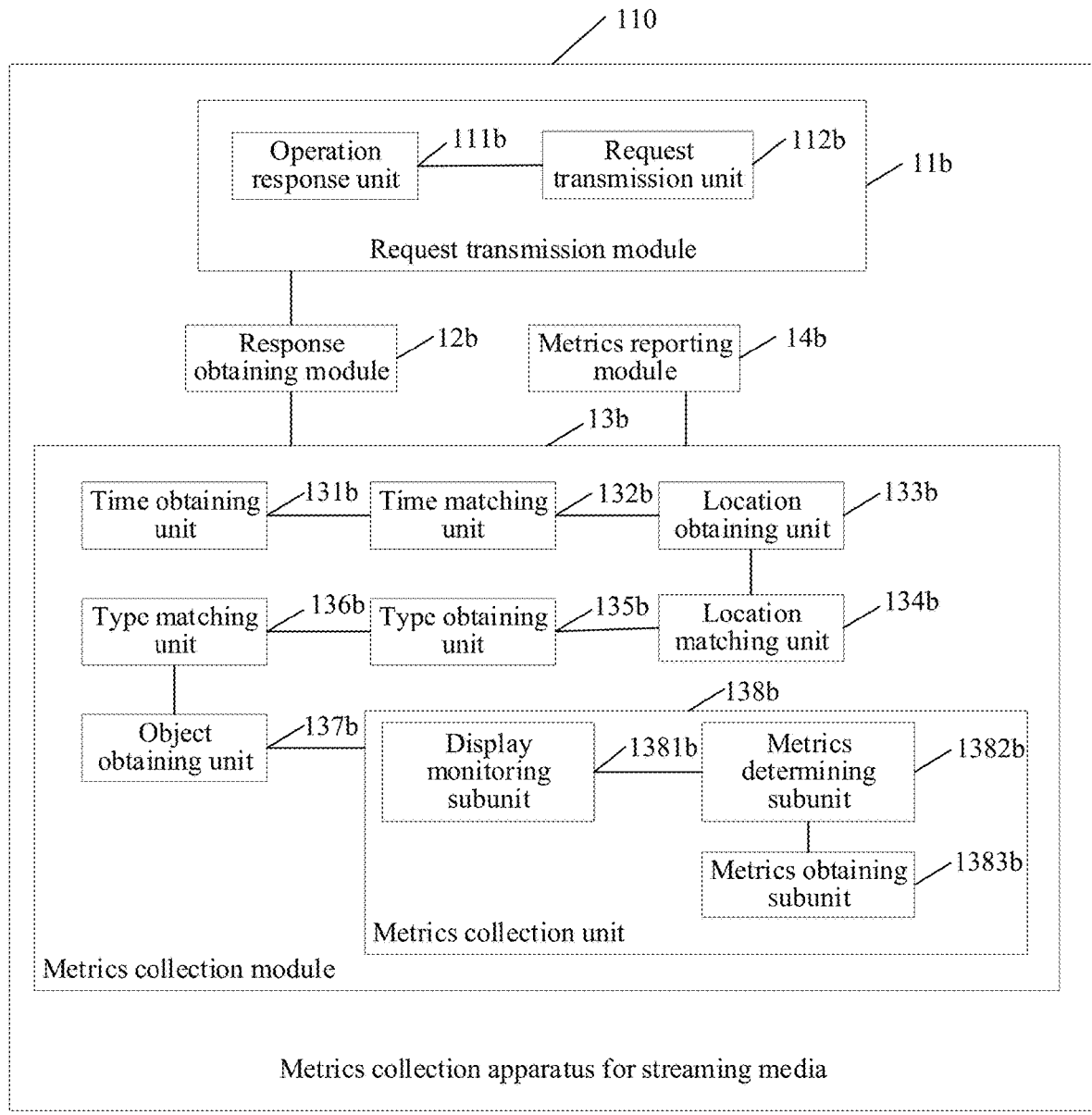
FIG. 11 is a schematic diagram of a metrics collection apparatus for streaming media according to an embodiment of the present disclosure.

FIG. 11 is a schematic diagram of a metrics collection apparatus for streaming media according to an embodiment of the present disclosure. The metrics collection apparatus for streaming media may be a computer program (including program code) running in the computer device. For example, the metrics collection apparatus for streaming media is application software. The apparatus may be configured to perform the corresponding steps in the method provided in the embodiments of the present disclosure. As shown in FIG. 11, a metrics collection apparatus 110 for streaming media may be applied to the computer device in the embodiment corresponding to FIG. 4, FIG. 6, or FIG. 9 above. For example, the apparatus may include: a request transmission module 11B, a response obtaining module 12b, a metrics collection module 13b, and a metrics reporting module 14b.

The request transmission module 11B is configured to transmit a media data obtaining request to an application service device in response to a trigger operation for streaming media. The response obtaining module 12b is configured to obtain a media data response message transmitted by the application service device, the media data response message including metrics collection configuration information, the metrics collection configuration information including metrics collection environment information and network slice information. The metrics collection module 13b is configured to: obtain environment information of the streaming media, and when the environment information matches the metrics collection environment information, collect metrics data corresponding to the streaming media according to the metrics collection configuration information. The metrics reporting module 14b is configured to: determine, based on the network slice information, a network path for reporting the metrics data, and report the metrics data to the application service device through the network path.

In some embodiments, the metrics collection configuration information includes a metrics collection time range. The metrics collection module 13b includes: a time obtaining unit 131B, configured to: obtain a system time, and determine the system time as the environment information of the streaming media; and a time matching unit 132b, configured to: when the system time is within the metrics collection time range, determine that the environment information matches the metrics collection environment information, and collect the metrics data corresponding to the streaming media according to a matching result, for example, collect the metrics data corresponding to the streaming media according to the matching result and other parameters in the metrics collection configuration information.

In some embodiments, the metrics collection configuration information includes a metrics collection geographic area. The metrics collection module 13b includes: a location obtaining unit 133b, configured to: obtain a geographic location of a terminal corresponding to the streaming media, and determine the geographic location as the environment information of the streaming media; and a location matching unit 134b, configured to: when the geographic location is located within the metrics collection geographic area, determine that the environment information matches the metrics collection environment information, and collect the metrics data corresponding to the streaming media according to a matching result.

In some embodiments, the metrics collection configuration information further includes a metrics collection data type. The metrics collection module 13b includes: a type obtaining unit 135b, configured to obtain a data type of the streaming media; and a type matching unit 136b, configured to collect the metrics data corresponding to the streaming media when the data type of the streaming media belongs to the metrics collection data type.

In some embodiments, the metrics collection configuration information further includes a metrics collection object, and the media data response message further includes media display data. According to the aspect of collecting the metrics data corresponding to the streaming media, the metrics collection module 13b includes: an object obtaining unit 137b, configured to: create a metrics collection task, and obtain the metrics collection object in the metrics collection configuration information; and a metrics collection unit 138b, configured to perform the metrics collection task for the media display data, to obtain metrics data associated with the metrics collection object.

In some embodiments, the metrics collection unit 138b includes: a display monitoring subunit 1381B, configured to: display the media display data through a media player, and monitor a display process of the media display data based on the metrics collection task; a metrics determining subunit 1382b, configured to: obtain data that is generated in the display process and is associated with the metrics collection object, and determine the data associated with the metrics collection object as the metrics data; and a metrics obtaining subunit 1383b, configured to obtain, through a media session handler, the metrics data determined based on the media player. According to the aspect of reporting the metrics data to the application service device through the network path, the metrics reporting module 14b is further configured to report the metrics data to the application service device based on the media session handler and the network path.

In some embodiments, the request transmission module 11B includes: an operation response unit 111B, configured to obtain a media identifier and a media content category of the streaming media in response to the trigger operation for the streaming media; and a request transmission unit 112b, configured to: encapsulate the media identifier and the media content category into the media data obtaining request, and transmit the media data obtaining request to the application service device, the media data obtaining request being used for instructing the application service device to obtain metrics collection configuration information corresponding to the media content category, obtain media display data corresponding to the media identifier, and generate the media data response message based on the metrics collection configuration information and the media display data.

In some embodiments, according to the aspect of determining, based on the network slice information, the network path for reporting the metrics data, the metrics reporting module 14b is further configured to: when only one candidate network path is included in the network slice information, determine the candidate network path as the network path for reporting the metrics data; and when the network slice information includes at least two candidate network paths and priorities of the candidate network paths, determine, from the at least two candidate network paths based on a path selection algorithm and the priorities of the candidate network paths, the network path for reporting the metrics data.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

This embodiment of the present disclosure provides a metrics collection apparatus for streaming media. The apparatus obtains metrics collection configuration information of streaming media, the metrics collection configuration information including metrics collection environment information and network slice information, the metrics collection environment information being used for indicating environment information when metrics data is acquirable for the streaming media, the network slice information being used for indicating a specified network path for reporting the metrics data; and metrics collection are performed on the streaming media based on the metrics collection configuration information. In this embodiment of the present disclosure, metrics collection environment information and network slice information are added to metrics collection configuration information of streaming media. Environment information when metrics data is collected for the streaming media is indicated by the metrics collection environment information, so that metrics collection can be performed on the streaming media under specific environment information, to improve the flexibility of metrics collection for streaming media, and metrics data is collected only under specific environment information. Moreover, metrics data is collected only under specific environment information, and the data amount of the acquired metrics data is greatly reduced, so that metrics collection in a specified and highly concerned metrics collection environment can be implemented, thereby reducing resource consumption in the metrics collection process. In addition, the network path for reporting metrics data may be indicated by using the network slice information, so that metrics data can be reported in a specific network path, and the efficiency of metrics reporting is improved, which is beneficial to carrying out flexible policy and charging control on a method for reporting metrics data.

Figure 12:
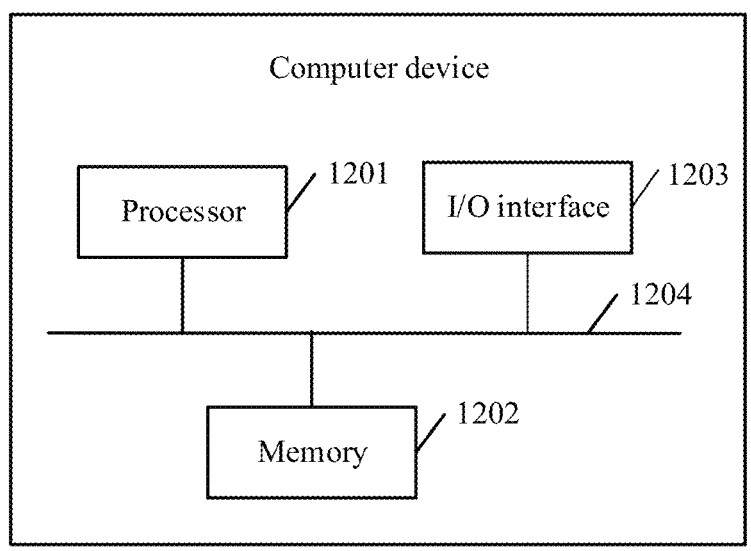
FIG. 12 is a schematic structural diagram of a computer device according to an embodiment of the present disclosure.

FIG. 12 is a schematic structural diagram of a computer device according to an embodiment of the present disclosure. As shown in FIG. 12, the computer device in this embodiment of the present disclosure may include one or more processors 1201, a memory 1202, and an I/O interface 1203. The processor 1201, the memory 1202, and the I/O interface 1203 are connected by a bus 1204. The memory 1202 is configured to store a computer program, and the computer program includes program instructions. The I/O interface 1203 is configured to receive data and output data, to implement data exchange with an application service device. The processor 1201 is configured to execute the program instructions stored in the memory 1202, to perform the following operations:

obtaining metrics collection configuration information of streaming media, the metrics collection configuration information including metrics collection environment information and network slice information, the metrics collection environment information being used for indicating environment information when metrics data is acquirable for the streaming media, the network slice information being used for indicating a network path for reporting the metrics data; and performing metrics collection on the streaming media based on the metrics collection configuration information.

Alternatively, the following operations are performed: transmitting a media data obtaining request to an application service device in response to a trigger operation for streaming media; obtaining a media data response message transmitted by the application service device, the media data response message including metrics collection configuration information, the metrics collection configuration information including metrics collection environment information and network slice information; obtaining environment information of the streaming media, and when the environment information matches the metrics collection environment information, collecting metrics data corresponding to the streaming media; determining, based on the network slice information, a network path for reporting the metrics data, and reporting the metrics data to the application service device through the network path.

In some embodiments, the processor 1201 may be a central processing unit (CPU), or the processor may be another general purpose processor, a digital signal processor (DSP), an application specific integrated circuit (ASIC), a field-programmable gate array (FPGA) or another programmable logical device, a discrete gate, a transistor logic device, a discrete hardware component, or the like. The general purpose processor may be a microprocessor, or the processor may be any conventional processor or the like.

The memory 1202 may include a read-only memory and a random access memory, and provide the instruction and data to the processor 1201 and the I/O interface 1203. A part of the memory 1202 may further include a non-volatile random access memory. For example, the memory 1202 may further store information of a device type.

In some embodiments, the computer device may perform, by using each built-in functional modules, the implementations provided by various steps in FIG. 3, FIG. 4, FIG. 6 or FIG. 9. For details, reference may be made to the implementations provided by the various steps in FIG. 3, FIG. 4, FIG. 6 or FIG. 9. Details are not described herein again.

In this embodiment of the present disclosure, a computer device is provided, including a processor, an I/O interface, and a memory. By obtaining computer instructions in the memory through the processor, various steps of the method shown in FIG. 3, FIG. 4, FIG. 6 or FIG. 9 are performed, to implement the metrics collection operation for the streaming media. In the embodiments of the present disclosure, metrics collection environment information and network slice information are added to metrics collection configuration information of streaming media. Environment information when metrics data is collected for the streaming media is indicated by the metrics collection environment information, so that metrics collection can be performed on the streaming media under specific environment information, to improve the flexibility of metrics collection for the streaming media. Moreover, it is beneficial to reducing the amount of data that needs to be acquired, so that metrics collection in a specified and highly concerned metrics collection environment can be implemented, thereby reducing resource consumption in the process of metrics collection for streaming media. In addition, the network path for reporting metrics data may be indicated by using the network slice information, so that metrics data can be reported in a specific network path, and the efficiency of metrics reporting is improved, which is beneficial to carrying out flexible policy and charging control on a method for reporting metrics data.

In this embodiment of the present disclosure, a computer-readable storage medium is further provided, storing a computer program, the computer program including program instructions, the program instructions, when executed by the processor, implementing the metrics collection method for streaming media provided by various steps in FIG. 3, FIG. 4, FIG. 6 or FIG. 9. For details, reference may be made to the implementations provided by the various steps in FIG. 3, FIG. 4, FIG. 6 or FIG. 9. Details are not described herein again. In addition, the description of beneficial effects of the same method are not described herein again. For technical details that are not disclosed in the embodiments of the computer-readable storage medium of the present disclosure, reference is made to the method embodiments of the present disclosure. In an example, the program instructions may be deployed to be executed on a computer device, or deployed to be executed on a plurality of computer devices at the same location, or deployed to be executed on a plurality of computer devices that are distributed in a plurality of locations and interconnected by a communication network.

The computer-readable storage medium may be an internal storage unit of the computer device or the metrics collection apparatus for streaming media provided in any one of the foregoing embodiments, for example, a hard disk or a memory of the computer device. The computer-readable storage medium may be alternatively an external storage device of the computer device, for example, a pluggable hard disk equipped on the computer device, a smart media card (SMC), a secure digital (SD) card, a flash card, or the like. For example, the computer-readable storage medium may include both an internal storage unit and an external storage device of the computer device. The computer-readable storage medium is configured to store the computer program and another program and data that are required by the computer device. The computer-readable storage medium may be further configured to temporarily store data that has been outputted or data to be outputted.

The term "include" and any variant thereof in the specification, claims, and accompanying drawings of the embodiments of the present disclosure are intended to cover non-exclusive including. For example, a process, method, apparatus, product, or device that includes a series of steps or modules is not limited to the listed steps or modules; and instead, further optionally includes a step or module that is not listed, or further optionally includes another step or unit that is intrinsic to the process, method, apparatus, product, or device.

A person of ordinary skill in the art may be aware that the units and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of the present disclosure.

The methods and related apparatuses provided by the embodiments of the present disclosure are described with reference to the method flowcharts and/or schematic structural diagrams provided in the embodiments of the present disclosure. Specifically, each process of the method flowcharts and/or each block of the schematic structural diagrams, and a combination of processes in the flowcharts and/or blocks in the block diagrams can be implemented by computer program instructions. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the schematic structural diagrams. These computer program instructions may also be stored in a computer-readable memory that can guide a computer or another programmable data processing device to work in a specified manner, so that the instructions stored in the computer-readable memory generate a product including an instruction apparatus, where the instruction apparatus implements functions specified in one or more processes in the flowcharts and/or one or more blocks in the schematic structural diagrams. The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A metrics collection method for streaming media, performed on a terminal device, the method comprising:
   transmitting a media data obtaining request to an application service device in response to a trigger operation for streaming media;
   obtaining a media data response message transmitted by the application service device, the media data response message comprising metrics collection configuration information, and the metrics collection configuration information comprising metrics collection environment information and network slice information;
   obtaining environment information of the streaming media, and when the environment information matches the metrics collection environment information, collecting metrics data corresponding to the streaming media;
   determining, based on the network slice information, a network path for reporting the metrics data; and
   reporting the metrics data to the application service device through the network path.

2. The method according to claim 1, wherein the metrics collection configuration information comprises a metrics collection time range; and
   the obtaining environment information of the streaming media, and when the environment information matches the metrics collection environment information, collecting metrics data corresponding to the streaming media comprises:
   obtaining a system time, and determining the system time as the environment information of the streaming media; and
   when the system time is within the metrics collection time range, determining that the environment information matches the metrics collection environment information, and collecting the metrics data corresponding to the streaming media.

3. The method according to claim 1, wherein the metrics collection configuration information comprises a metrics collection geographic area; and
   the obtaining environment information of the streaming media, and when the environment information matches the metrics collection environment information, collecting metrics data corresponding to the streaming media comprises:
   obtaining a geographic location of the terminal device corresponding to the streaming media, and determining the geographic location as the environment information of the streaming media; and
   when the geographic location is located within the metrics collection geographic area, determining that the environment information matches the metrics collection environment information, and collecting the metrics data corresponding to the streaming media.

4. The method according to claim 1, wherein the metrics collection configuration information comprises a metrics collection data type; and
   the method further comprises:
   obtaining a data type of the streaming media; and
   collecting the metrics data corresponding to the streaming media when the data type of the streaming media belongs to the metrics collection data type.

5. The method according to claim 1, wherein the metrics collection configuration information comprises a reporting interval; and
   the reporting the metrics data to the application service device through the network path comprises:
   reporting the metrics data to the application service device through the network path based on a time interval indicated by the reporting interval.

6. The method according to claim 1, wherein the metrics collection configuration information comprises a metrics collection object, and the media data response message further comprises media display data; and
   the collecting metrics data corresponding to the streaming media comprises:
   creating a metrics collection task, to obtain metrics data associated with the metrics collection object in the metrics collection configuration information; and
   performing the metrics collection task for the media display data, to obtain the metrics data associated with the metrics collection object.

7. The method according to claim 6, wherein the performing the metrics collection task for the media display data, to obtain metrics data associated with the metrics collection object comprises:

displaying the media display data through a media player, and monitoring a display process of the media display data based on the metrics collection task;

obtaining data that is generated in the display process and is associated with the metrics collection object, and determining the data associated with the metrics collection object as the metrics data; and obtaining, through a media session handler, the metrics data determined based on the media player; and the reporting the metrics data to the application service device through the network path comprises:

reporting the metrics data to the application service device based on the media session handler and the network path.

8. The method according to claim 1, wherein the transmitting a media data obtaining request to an application service device in response to a trigger operation for streaming media comprises:

obtaining a media identifier and a media content category of the streaming media in response to the trigger operation for the streaming media; and encapsulating the media identifier and the media content category into the media data obtaining request, and transmitting the media data obtaining request to the application service device, the media data obtaining request being used for instructing the application service device to obtain metrics collection configuration information corresponding to the media content category, obtain media display data corresponding to the media identifier, and generate the media data response message based on the metrics collection configuration information and the media display data.

9. The method according to claim 1, wherein the transmitting a media data obtaining request to an application service device in response to a trigger operation for streaming media comprises:

obtaining a media identifier of the streaming media in response to the trigger operation for the streaming media; and encapsulating the media identifier into the media data obtaining request, and transmitting the media data obtaining request to the application service device, the media data obtaining request being used for instructing the application service device to obtain media display data corresponding to the media identifier, determine at least one media content category of the streaming media based on the media display data, obtain corresponding metrics collection configuration information based on the at least one media content category, and generate the media data response message based on the metrics collection configuration information and the media display data.

10. The method according to claim 1, wherein the determining, based on the network slice information, a network path for reporting the metrics data comprises:

when the network slice information comprises at least two candidate network paths and priorities of the candidate network paths, determining, from the at least two candidate network paths based on a path selection algorithm and the priorities of the candidate network paths, the network path for reporting the metrics data.

11. A metrics collection apparatus for streaming media, the apparatus comprising a processor and a memory, the processor being connected to the memory, the memory being configured to store program code, the processor being configured to invoke the program code, to perform:

transmitting a media data obtaining request to an application service device in response to a trigger operation for streaming media;

obtaining a media data response message transmitted by the application service device, the media data response message comprising metrics collection configuration information, and the metrics collection configuration information comprising metrics collection environment information and network slice information;

obtaining environment information of the streaming media, and when the environment information matches the metrics collection environment information, collecting metrics data corresponding to the streaming media;

determining, based on the network slice information, a network path for reporting the metrics data; and reporting the metrics data to the application service device through the network path.

12. The apparatus according to claim 11, wherein the metrics collection configuration information comprises a metrics collection time range; and the obtaining environment information of the streaming media, and when the environment information matches the metrics collection environment information, collecting metrics data corresponding to the streaming media comprises:

obtaining a system time, and determining the system time as the environment information of the streaming media; and when the system time is within the metrics collection time range, determining that the environment information matches the metrics collection environment information, and collecting the metrics data corresponding to the streaming media.

13. The apparatus according to claim 11, wherein the metrics collection configuration information comprises a metrics collection geographic area; and the obtaining environment information of the streaming media, and when the environment information matches the metrics collection environment information, collecting metrics data corresponding to the streaming media comprises:

obtaining a geographic location of the terminal device corresponding to the streaming media, and determining the geographic location as the environment information of the streaming media; and when the geographic location is located within the metrics collection geographic area, determining that the environment information matches the metrics collection environment information, and collecting the metrics data corresponding to the streaming media.

14. The apparatus according to claim 11, wherein the metrics collection configuration information comprises a metrics collection data type; and the processor is further configured to perform:

obtaining a data type of the streaming media; and collecting the metrics data corresponding to the streaming media when the data type of the streaming media belongs to the metrics collection data type.

15. The apparatus according to claim 11, wherein the metrics collection configuration information comprises a reporting interval; and the reporting the metrics data to the application service device through the network path comprises:
reporting the metrics data to the application service device through the network path based on a time interval indicated by the reporting interval.

16. The apparatus according to claim 11, wherein the metrics collection configuration information comprises a metrics collection object, and the media data response message further comprises media display data; and
the collecting metrics data corresponding to the streaming media comprises:
creating a metrics collection task, to obtain metrics data associated with the metrics collection object in the metrics collection configuration information; and
performing the metrics collection task for the media display data, to obtain the metrics data associated with the metrics collection object.

17. The apparatus according to claim 16, wherein the performing the metrics collection task for the media display data, to obtain metrics data associated with the metrics collection object comprises:
displaying the media display data through a media player, and monitoring a display process of the media display data based on the metrics collection task;
obtaining data that is generated in the display process and is associated with the metrics collection object, and determining the data associated with the metrics collection object as the metrics data; and
obtaining, through a media session handler, the metrics data determined based on the media player; and
the reporting the metrics data to the application service device through the network path comprises:
reporting the metrics data to the application service device based on the media session handler and the network path.

18. The apparatus according to claim 11, wherein the transmitting a media data obtaining request to an application service device in response to a trigger operation for streaming media comprises:
obtaining a media identifier and a media content category of the streaming media in response to the trigger operation for the streaming media; and
encapsulating the media identifier and the media content category into the media data obtaining request, and transmitting the media data obtaining request to the application service device,
the media data obtaining request being used for instructing the application service device to obtain metrics collection configuration information corresponding to the media content category, obtain media display data corresponding to the media identifier, and generate the media data response message based on the metrics collection configuration information and the media display data.

19. The apparatus according to claim 11, wherein the determining, based on the network slice information, a network path for reporting the metrics data comprises:
when the network slice information comprises at least two candidate network paths and priorities of the candidate network paths, determining, from the at least two candidate network paths based on a path selection algorithm and the priorities of the candidate network paths, the network path for reporting the metrics data.

20. A non-transitory computer-readable storage medium, storing a computer program, the computer program comprising program instructions, the program instructions, when executed by a processor, causing the processor to perform:
transmitting a media data obtaining request to an application service device in response to a trigger operation for streaming media;
obtaining a media data response message transmitted by the application service device, the media data response message comprising metrics collection configuration information, and the metrics collection configuration information comprising metrics collection environment information and network slice information;
obtaining environment information of the streaming media, and when the environment information matches the metrics collection environment information, collecting metrics data corresponding to the streaming media;
determining, based on the network slice information, a network path for reporting the metrics data; and
reporting the metrics data to the application service device through the network path.

* * * * *